US011486365B2

(12) United States Patent
Liingaard et al.

(10) Patent No.: US 11,486,365 B2
(45) Date of Patent: Nov. 1, 2022

(54) ASSEMBLY FOR A WIND TURBINE, AND METHOD OF OPERATING AN ASSEMBLY FOR A WIND TURBINE

(71) Applicant: Vestas Wind Systems A/S, Aarhus N. (DK)

(72) Inventors: Anders Haslund Liingaard, Hinnerup (DK); Claus Hald Therkildsen, Ryomgård (DK)

(73) Assignee: Vestas Wind Systems A/S, Aarhus N (DK)

( * ) Notice: Subject to any disclaimer, the term of this patent is extended or adjusted under 35 U.S.C. 154(b) by 484 days.

(21) Appl. No.: 16/334,572

(22) PCT Filed: Aug. 21, 2017

(86) PCT No.: PCT/DK2017/050270
§ 371 (c)(1),
(2) Date: Mar. 19, 2019

(87) PCT Pub. No.: WO2018/054435
PCT Pub. Date: Mar. 29, 2018

(65) Prior Publication Data
US 2021/0285422 A1    Sep. 16, 2021

(30) Foreign Application Priority Data

Sep. 21, 2016   (DK) .......................... PA 2016 70744

(51) Int. Cl.
*F03D 15/00* (2016.01)
*F03D 80/70* (2016.01)

(52) U.S. Cl.
CPC ............. *F03D 15/00* (2016.05); *F03D 80/70* (2016.05); *F05B 2240/50* (2013.01); *F05B 2240/60* (2013.01); *F05B 2260/30* (2013.01)

(58) Field of Classification Search
CPC ........ F03D 7/0268; F03D 15/00; F03D 80/50; F03D 80/70; F05B 2240/50;
(Continued)

(56) References Cited

U.S. PATENT DOCUMENTS 7,397,145 B2 * 7/2008 Struve .................. F03D 7/0244
290/55
8,334,608 B2 * 12/2012 Pechlivanoglou .... F03D 7/0248
290/44

(Continued)

FOREIGN PATENT DOCUMENTS

CN          101014767 A    8/2007
CN          101328859 A    12/2008
(Continued)

OTHER PUBLICATIONS

European Patent Office, International Preliminary Report on Patentability in PCT Application No. PCT/DK2017/050270, dated Dec. 20, 2018.
(Continued)

*Primary Examiner* — Christopher R Legendre
(74) *Attorney, Agent, or Firm* — Wood Herron & Evans LLP

(57) ABSTRACT

An assembly (127) for a wind turbine (100) includes a housing (126) having a first bearing (150) and a second bearing (154). A shaft (142) extends axially within the housing (126) and is supported by the first bearing (150) and the second bearing (154) for rotation relative to the housing (126). A radially outer portion of the shaft (142) includes at least one shaft engagement formation (146) positioned between the first bearing (150) and the second bearing (154). A retention mechanism (156) is moveable axially between: an engaged position in which it can engage the shaft engagement formation (146), such that rotation of the shaft (142) is constrained; and a disengaged position in which the
(Continued)

retention mechanism (156) cannot engage the shaft engagement formation (146), thereby allowing rotation of the shaft (142). Additionally, a method of operating such an assembly.

21 Claims, 11 Drawing Sheets

(58) Field of Classification Search
CPC .............. F05B 2240/60; F05B 2260/30; F05B 2260/31; Y02E 10/72; Y02E 10/74
See application file for complete search history.

(56) References Cited

U.S. PATENT DOCUMENTS

| | | | |
|---|---|---|---|
| 8,944,766 B2 * | 2/2015 | Nielsen | F03D 80/50 |
| | | | 416/169 R |
| 10,830,209 B2 * | 11/2020 | Larsen | F03D 80/50 |
| 11,396,861 B2 * | 7/2022 | Liingaard | F03D 7/0268 |
| 2007/0212226 A1 | 9/2007 | Guihard et al. | |
| 2012/0308398 A1 * | 12/2012 | Agardy | F03D 15/00 |
| | | | 416/244 R |
| 2013/0292950 A1 * | 11/2013 | Ritschel | F03D 9/25 |
| | | | 290/55 |
| 2014/0010656 A1 * | 1/2014 | Nies | F03D 80/50 |
| | | | 416/204 R |
| 2021/0285422 A1 * | 9/2021 | Liingaard | F03D 80/70 |

FOREIGN PATENT DOCUMENTS

| | | | |
|---|---|---|---|
| CN | 101451509 A | | 6/2009 |
| CN | 101571107 A | | 11/2009 |
| CN | 201651087 U | | 11/2010 |
| CN | 201730772 U | | 2/2011 |
| CN | 202017581 U | | 10/2011 |
| CN | 102630280 A | | 8/2012 |
| CN | 104675820 A | | 6/2015 |
| CN | 104912748 A | | 9/2015 |
| CN | 204921257 U | | 12/2015 |
| DE | 202007018565 U1 | | 11/2008 |
| EP | 1167755 A2 | | 1/2002 |
| EP | 1291521 A1 | | 3/2003 |
| EP | 1780409 A1 | | 5/2007 |
| EP | 2620636 A1 | | 7/2013 |
| EP | 2905467 A1 | | 8/2015 |
| KR | 20110070623 A | | 6/2011 |
| KR | 20140038614 A | * | 3/2014 |
| KR | 20140072561 A | * | 6/2014 |

OTHER PUBLICATIONS

European Patent Office, Wirtten Opinion of the International Preliminary Examining Authority in PCT Application No. PCT/DK2017/050270, dated Aug. 15, 2018.

European Patent Office, Written Opinion of the International Searching Authority in PCT Application No. PCT/DK2017/050270, dated Nov. 8, 2017.

Danish Patent and Trademark Office, Search and Examination Report in PA 2016 70744, dated Apr. 3, 2017.

China National Intellectual Property Administration, First Notification of Office Action in CN Application No. 201780057516.1, dated Dec. 4, 2019.

Intellectual Property India, Examination Report in IN Application No. 201917009072, dated May 21, 2021.

* cited by examiner

ASSEMBLY FOR A WIND TURBINE, AND METHOD OF OPERATING AN ASSEMBLY FOR A WIND TURBINE

FIELD OF INVENTION

The present invention relates to an assembly that enables the constraining of rotation of a shaft within a housing of a wind turbine.

The invention has been developed primarily to allow rotational locking of a main shaft of a wind turbine to allow technicians to safely work on, or in the vicinity of, the turbine and its components, and embodiments are described with this application in mind. It will be appreciated, however, that the invention may be deployed for other reasons and in other forms.

BACKGROUND

A wind turbine typically includes a tower topped with a nacelle. In one type of wind turbine, the nacelle includes a housing having at least two axially spaced apart bearings. A shaft extends through, and is supported by, the bearings for rotation relative to the housing. Typically, one end of the shaft extends outside the nacelle and supports the turbine hub. The other end of the shaft is connected to a gearbox and/or other drivetrain and power generation components.

Wind turbines generate power by converting rotational energy to electrical energy. Especially for large turbines, the amount of torque generated may be substantial. Blades of the turbine may be feathered to reduce torque, but even then, swirls and gusts of wind may cause unpredictable rotation of the turbine.

A locking mechanism may be used to positively prevent rotation of the shaft when it is desired to work on the turbine. One such lock requires a locking hub to be mounted on the shaft between the housing and the hub. The locking hub is a radial flange with holes that can be engaged by locking pins mounted to the outside of the housing. Such a locking hub takes up valuable space in the nacelle and may itself be a potential source of injury unless it is provided with a shroud or cage, which may add bulk, cost and complexity.

SUMMARY

In accordance with a first aspect, the invention provides an assembly for a wind turbine, comprising:
a housing comprising:
  a first bearing; and
  a second bearing axially spaced apart from the first bearing;
a shaft extending axially within the housing and being at least partly supported by the first bearing and the second bearing for rotation relative to the housing, a radially outer portion of the shaft comprising at least one shaft engagement formation positioned between the first bearing and the second bearing;
a retention mechanism moveable axially between:
  an engaged position in which the retention mechanism can engage the at least one shaft engagement formation, such that rotation of the shaft is constrained; and
  a disengaged position in which the retention mechanism cannot engage the at least one shaft engagement formation, thereby allowing rotation of the shaft.

The retention mechanism may comprise an axially extending spline, groove, finger, key, bolt, pin, slot, keyway, aperture, rib, rail, hole, locking ring, slot, keyway, hole or aperture.

The retention mechanism may comprise a locking ring moveable axially between the engaged position and the disengaged position. The locking ring may comprise at least one locking ring formation for engaging the shaft engagement formation when the retention mechanism is in the engaged position The housing may comprise at least one housing engagement formation for engaging the retention mechanism. The at least one housing engagement formation and the at least one shaft retaining formation may be configured such that the retention mechanism can simultaneously engage both the at least one housing engagement formation and the at least one shaft retaining formation when the retention mechanism is in the engaged position.

The retention mechanism may engage the at least one housing engagement formation in both the engaged and disengaged positions, thereby to constrain the rotation of the shaft.

In the disengaged position, the retention mechanism may not engage the at least one housing engagement formation.

The at least one housing engagement formation may comprise at least one axially extending spline, groove, finger, key, bolt, pin, slot, keyway, aperture, rib, rail, hole, locking ring, slot, keyway, hole or aperture, configured to engage the retention mechanism in at least the engaged position.

The at least one shaft engagement formation may comprise at least one axially extending spline, groove, finger, key, bolt, pin, slot, keyway, aperture, rib, rail, hole, locking ring, slot, keyway, hole or aperture, configured to engage the retention mechanism in at least the engaged position.

The assembly may comprise an actuator configured to selectively move the retention mechanism between the engaged and disengaged positions. The actuator may be mounted to a radially inner portion of the housing. The actuator may be hydraulically, electromagnetically, magnetically, or electrically powered.

The assembly may comprise a viewing window for allowing visual confirmation that the retention mechanism is in the engaged position.

In accordance with a second aspect, the invention provides a method of operating the assembly of the first aspect, the method comprising:
  rotating, or allowing rotation of, the shaft to a lockable position while the retention mechanism is in the disengaged position;
  moving the retention mechanism to the engaged position, thereby to constrain rotation of the shaft.

BRIEF DESCRIPTION OF DRAWINGS

Embodiments of the invention will now be described, by way of example only, with reference to the accompanying drawings, in which.

DETAILED DESCRIPTION

Figure 1:
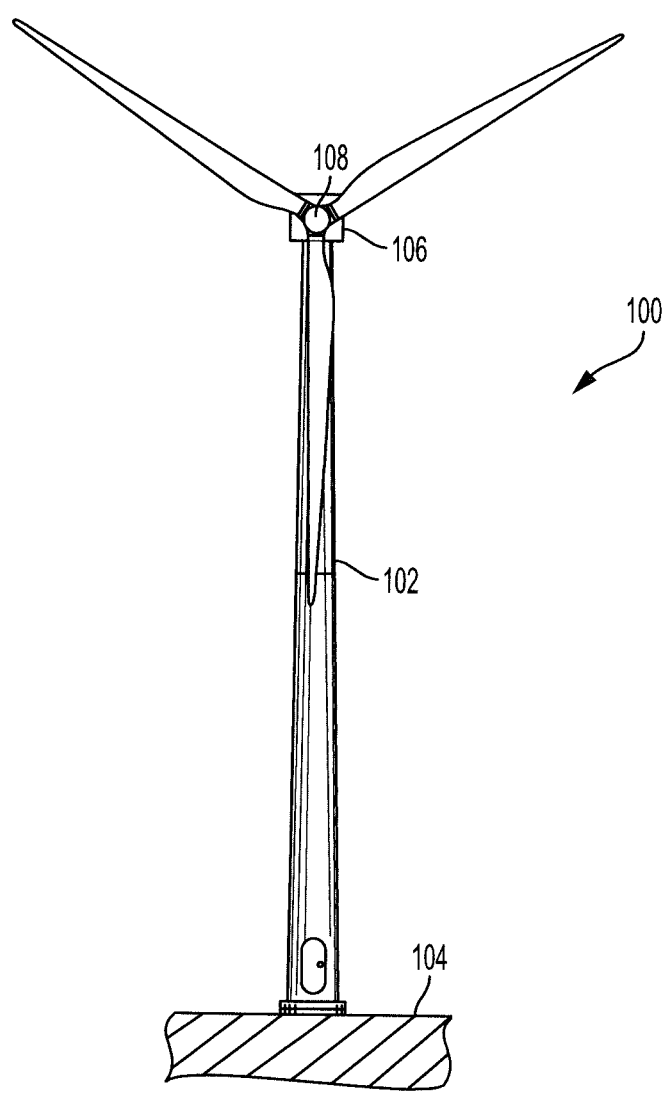
FIG. 1 is a front elevation of a wind turbine, comprising an assembly according to the invention.

Referring to FIG. 1, there is shown a wind turbine 100. The wind turbine 100 includes a generally vertical tower 102 mounted to a foundation 104, which may be on the land, or wholly or partially underwater. The tower 102 supports a nacelle 106. A rotor 108 is mounted to a shaft (not shown) for rotation about a horizontal axis, to convert wind into rotational energy. The nacelle 106 houses a generator (see FIG. 2) along with other mechanical and electrical systems to support the conversion of the rotational energy into electrical energy.

Figure 2:
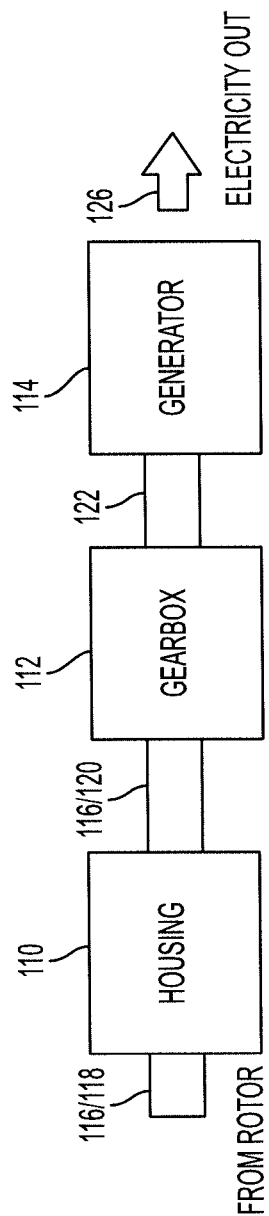
FIG. 2 is a schematic of a drivetrain of the wind turbine of FIG. 1.

The nacelle 106 houses a number of functional components. Turning to FIG. 2, the nacelle can include a shaft housing 110, a gearbox 112 and a generator 114. A main shaft 116 extends through the housing 110, and is supported for rotation on bearings as described below. An input portion 118 of the shaft 116 is connected to, and driven by, the rotor 108 (see FIG. 1). An output portion 120 of the shaft 116 provides input drive to the gearbox 112. The gearbox 112 steps up the rotational speed via internal gears (not shown) and drives a gearbox output 122. The gearbox output 122 in turn drives the generator 114, which converts the rotation of the gearbox output 122 into electricity 126. The electricity 126 generated by the generator 114 may then be converted by other components (not shown) as required before being supplied to, eg, the grid. So-called "direct drive" wind turbines that do not use gearboxes are also known. The gearbox may therefore be considered optional.

The gearbox 112, generator 114, and other components (not shown) may need to be serviced, maintained and repaired. Doing so while the rotor is turning may be dangerous or impossible. The kinetic and electrical energy generated by the rotor turning may make it dangerous for any activity to be undertaken in or near the housing, gearbox, generator and other components. Even if the blades of the wind turbine are feathered, it is still possible for swirls and gusts of wind to cause the rotor to rotate, which may endanger technicians.

Figure 3:
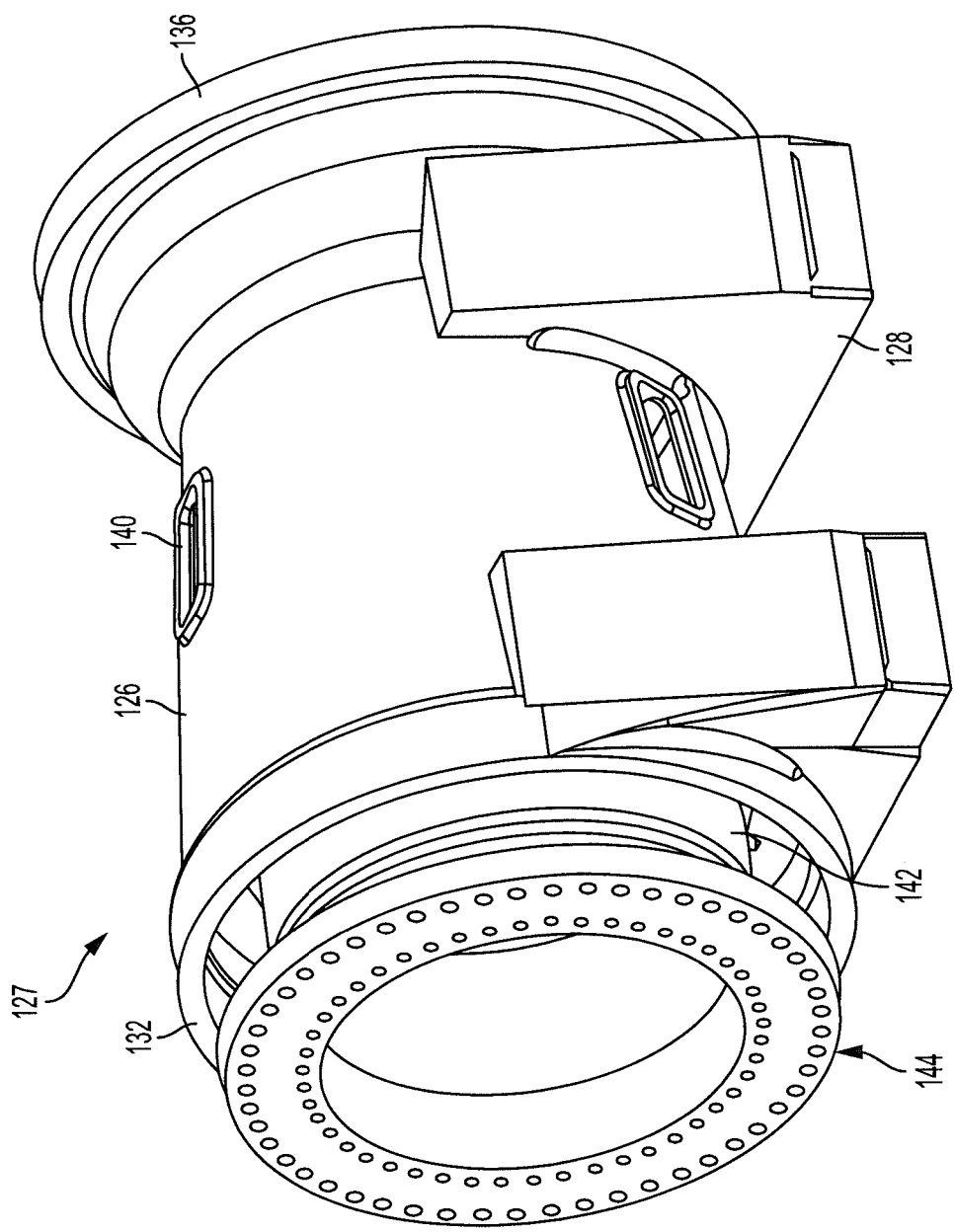
FIG. 3 is a perspective view of an assembly according to the invention.
Figure 6:
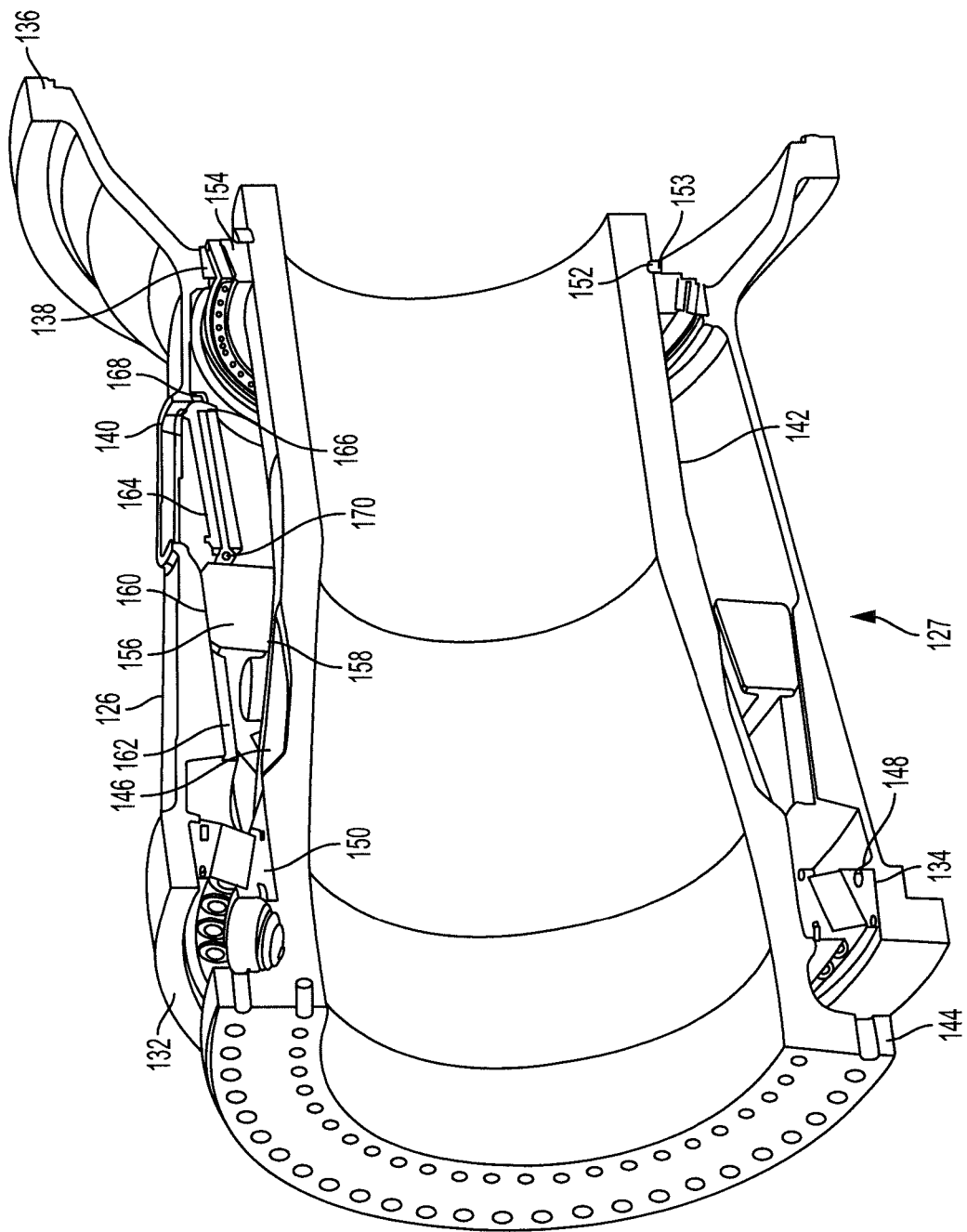
FIG. 6 is a longitudinal section of the assembly of FIG. 3, showing a retention mechanism in the form of a locking ring in a disengaged position, and showing a position of bearings.
Figure 7:
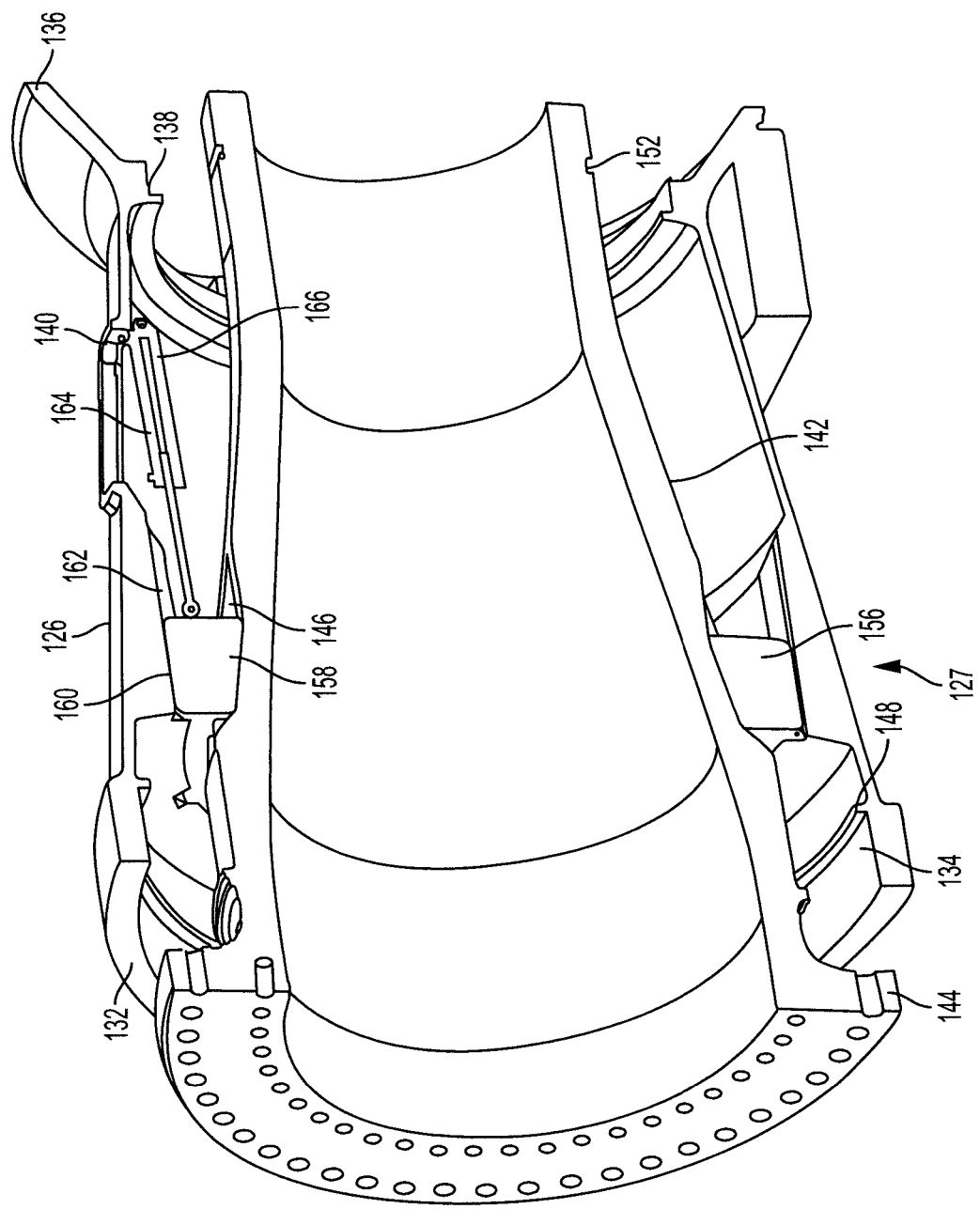
FIG. 7 is a longitudinal section corresponding to that of FIG. 6, showing the retention mechanism in an engaged position.
Figure 8:
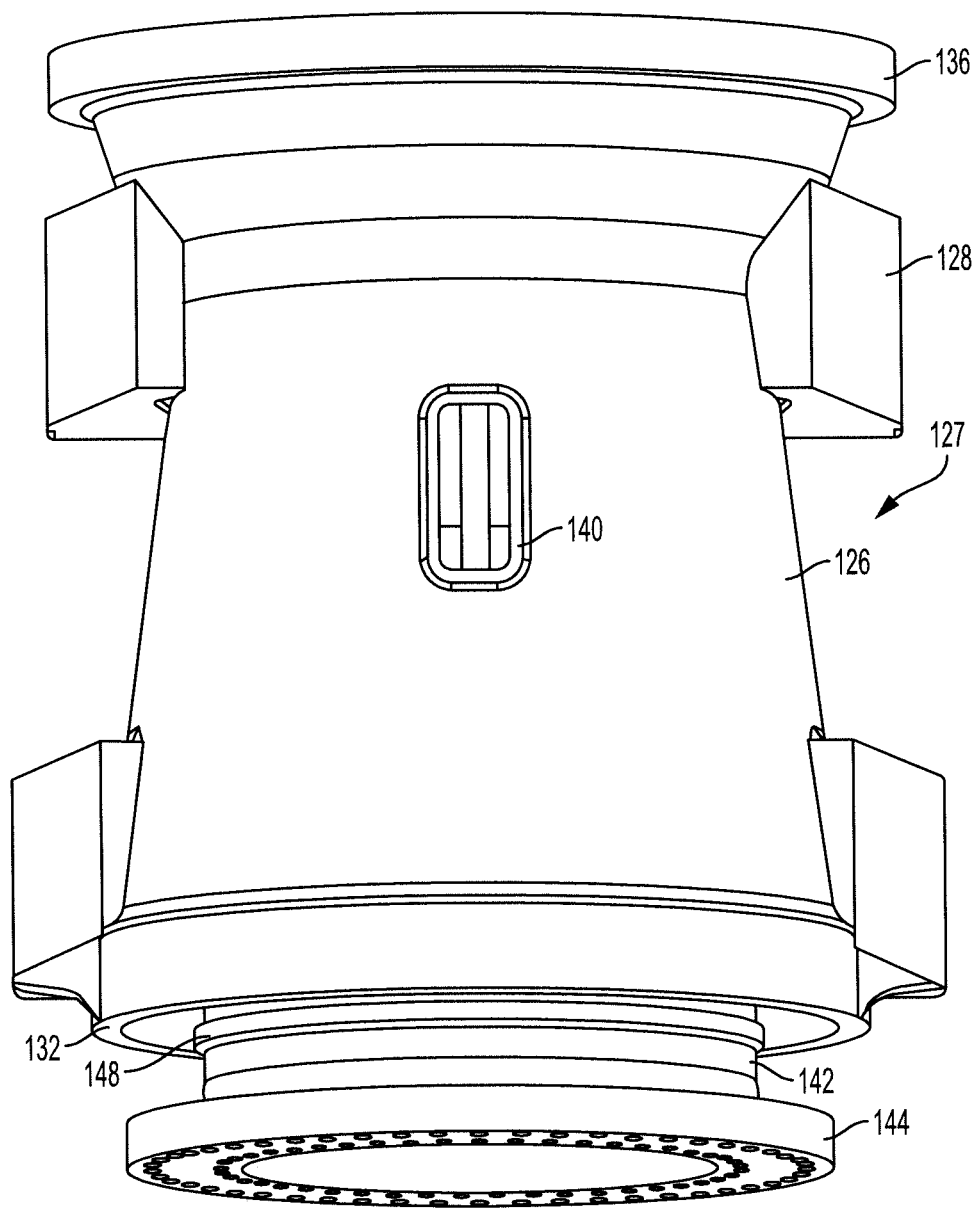
FIG. 8 is top view of the assembly of FIGS. 3 to 7.

FIGS. 3 to 8 show a practical embodiment of an assembly 127, comprising a housing 126 that corresponds to the housing 110 shown in FIG. 2. As best shown in FIG. 3, the housing 126 comprises legs or struts 128 for mounting the housing to a support frame, for example a base frame or bed plate (not shown), within the nacelle 106. As best shown in FIGS. 4 to 7, the housing 110 includes a front flared portion 132 defining a front bearing seat 134, and a rear flared portion 136 defining a rear bearing seat 138. A number of circumferentially spaced apart viewing windows 140 are positioned as best shown in FIGS. 3 and 8.

In the embodiment of FIGS. 3 to 8, the housing 126 also comprises housing engagement formations in the form of a plurality of circumferentially spaced apart axially extending housing grooves 162. The housing grooves 162 may be, for example, moulded, machined or additively manufactured onto an inner surface of the housing 126. The housing grooves 162 may also be part of a separate collar (not shown), or may be defined by axial gaps between separate axial ribs or lands (not shown), which are mounted in the housing 126 by, for example, welding, bonding, fastening, or other attachment means.

Figure 4:
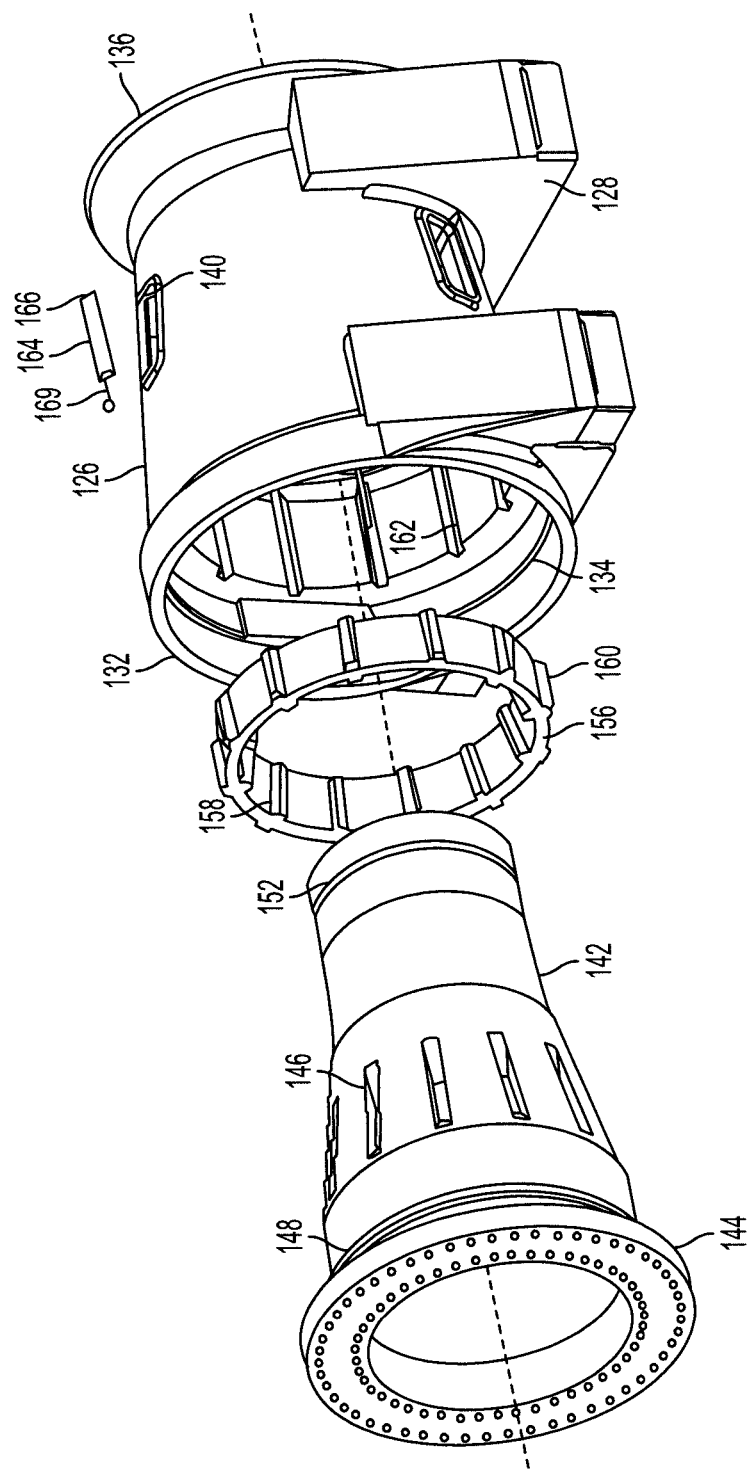
FIG. 4 is an exploded view of the assembly of FIG. 3.
Figure 5:
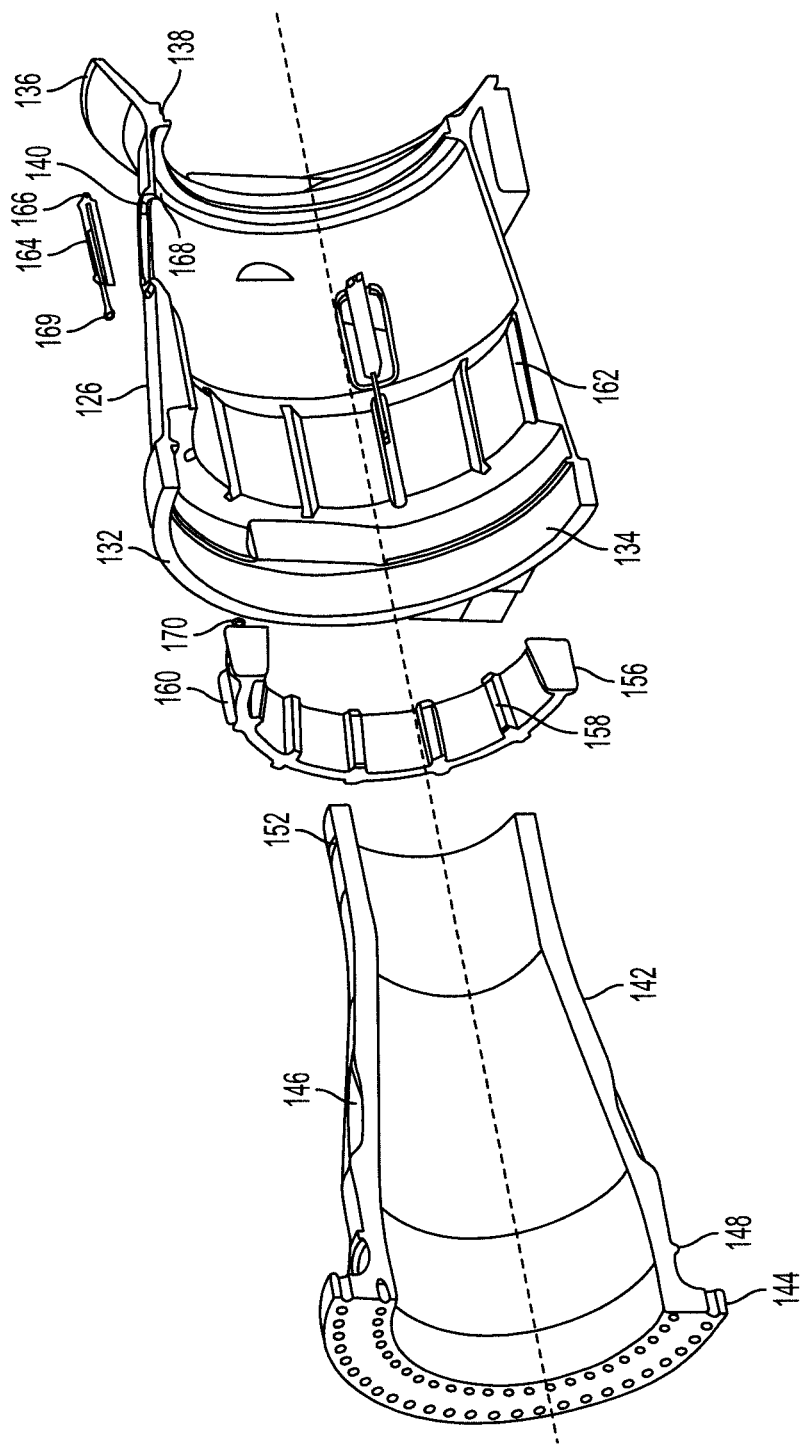
FIG. 5 is a longitudinal section of the view of FIG. 4.

The assembly 127 also comprises a shaft 142 (corresponding with main shaft 116 in FIG. 2) extending axially within the housing 126. The shaft 142 includes a flange 144 to which a rotor hub (not shown) may be bolted, either directly or via an intermediate shaft (not shown). As best shown in FIG. 4, a radially outer portion of the shaft 142 includes several shaft engagement formations in the form of circumferentially spaced apart, axially extending shaft grooves 146 in an outer surface of the shaft 142. The shaft grooves 146 may be, for example, moulded, machined or additively manufactured onto an outer surface of the shaft 142. The shaft grooves 146 may also be part of a separate collar (not shown), or may be defined by axial gaps between separate axial ribs or lands (not shown), which are mounted on the shaft 142 by, for example, welding, bonding, fastening, or other attachment means.

As best shown in FIG. 6, the shaft 142 includes a front bearing retainer 148 for retaining a front bearing 150 in the front bearing seat 134 and a rear bearing retainer groove 152 for holding a rear bearing clip 153 that retains a rear bearing 154 in the rear bearing seat 138. The front bearing 150 and rear bearing 154 support the shaft 142 for rotation relative to the housing 126. It will be noted that the front bearing 150, rear bearing 154 and rear bearing clip 153 are only shown in FIG. 6, and have been omitted from the other drawings for the sake of clarity.

The shaft 142 is tapered along its length from the front. This allows for a larger front bearing 150 and greater surface area for the front bearing seat 134 and front bearing retainer 148, which allows for better support for the relatively heavier rotor end of the shaft 142.

As best shown in FIGS. 4 to 7, the assembly further comprises a retention mechanism, which in this embodiment takes the form of a locking ring 156. Locking ring formations in the form of axially extending inner ribs, ridges or splines 158 are circumferentially spaced around a radially inner portion of the locking ring 156, and axially extending outer splines 160 are circumferentially spaced around a radially outer portion of the locking ring 156. The inner splines 158 are sized and shaped to key to the shaft grooves 146. The outer splines 160 are sized and shaped to key to the housing grooves 162. The outer splines 160 and corresponding housing grooves 162 are configured such that the locking ring 156 can slide axially, with the outer splines 160 engaging the housing grooves 162 and axially guiding the locking ring 156 as it slides.

In the embodiment of FIGS. 3 to 8, there is provided an actuator in the form of three circumferentially spaced apart hydraulic rams 164. Other actuators would also be possible such as linear electric actuators. A first end 166 of each ram is mounted to the housing 126 by way of a housing bracket 168 disposed on an inner surface of the housing 126. A second end 169 of each hydraulic ram 164, opposite the first end 166, is attached to the locking ring 156 by way of a locking ring bracket 170. Hydraulic lines (not shown) selectively provide hydraulic pressure to one end or the other of a piston of the hydraulic ram 164, thereby to cause the piston, and hence the locking ring 156, to move axially, as described in more detail below.

In use, when the wind turbine is generating power, the locking ring 156 is positioned in a disengaged state, as shown in FIG. 6. In this state, the locking ring 156 cannot engage the shaft grooves 146, and so the shaft 142 is free to rotate when driven by the rotor 108.

When it is desired to prevent rotation of shaft 142, for example to enable the turbine to be maintained by technicians, hydraulic pressure is supplied to the hydraulic rams 164 by way of a hydraulic circuit (not shown) such that the locking ring 156 slides axially within the housing 126, guided by the outer splines 160 in the housing grooves 162. As the inner splines 158 engage the shaft grooves 162, the locking ring 156 locks the shaft 142 such that rotation of the shaft 142 is constrained. With the locking ring 156 in this engaged position, any torque generated by the rotor 108 is transferred statically to the housing 126 through the shaft grooves 146, locking ring 156 and housing grooves 162.

The assembly 127 may be designed such that the locking ring 156 is controlled to move into the engaged position shown in FIG. 7 only when the shaft 142 is stationary or moving relatively slowly. As explained above, the amount of torque generated by a wind turbine may be significant, and it may not be desirable to allow the locking ring 156 to move into the engaged position while the shaft 142 is rotating with any significant speed. Rotation of the shaft 142 may be controlled by a brake (not shown), which may be applied after the blades have been feathered to reduce the amount of torque generated.

Alternatively or in addition, the shaft 142 may be driven, for example by an electric motor (not shown), to a position in which the shaft grooves 146 align with corresponding inner splines 158 of the locking ring 156, which enables the locking ring 156 to be driven axially into the engaged position by the hydraulic rams 164.

Optionally, either or both of the inner splines 158 and/or shaft grooves 146 may have axially tapered lead-in portions to assist in guiding each inner spline 158 into an adjacent shaft groove 146.

The optional viewing windows 140 allow technicians to visually confirm whether the locking ring 156 is in the engaged or disengaged state. The viewing windows 140 may be simple apertures, or may be closed with a transparent sheet material such as glass or plastics.

Although the embodiment described includes housing engagement formations in the form of housing grooves 162, it will be appreciated that this feature is optional. For example, the retention mechanism may be mounted directly to the housing for axial movement between the engaged and disengaged positions. In terms of modifying the embodiment described in relation to FIGS. 3 to 8, this would mean that the sole connection between the locking ring 156 and the housing 126 would be the hydraulic rams 164. Any torque in the shaft 142 when the locking ring 156 is in the engaged position would be statically transferred from the locking ring 156 to the housing 126 solely via the hydraulic rams 164. In yet another variation of this embodiment, the locking ring 156 can be omitted, and the hydraulic rams 164 themselves (or a locking element attached to each of the hydraulic rams 164) can engage the shaft engagement formations directly when in the engaged position, to constrain rotation of the shaft 142.

The locking ring 156 of the embodiment described in relation to FIGS. 3 to 8 has inner and outer splines. It will be appreciated that in other embodiments, only inner or outer splines may be provided. In that case, the shaft grooves 146 and housing grooves 162 are oriented in radially the same direction, so that they can mesh with the corresponding splines. In at least one embodiment of this type, each inner spline 158 engages both a shaft groove 146 and a housing groove 162. In this arrangement, outer splines 160 may not be required. The skilled person will appreciate that in other embodiments, each outer spline 160 engages both a shaft groove 146 and a housing groove 162. In this arrangement, inner splines 158 may not be required.

Although the embodiment described in relation to FIGS. 3 to 8 shows a locking ring 156 with the same number of inner splines 158, outer splines 160, shaft grooves 146 and housing grooves 162, it will be appreciated that there may be a greater number of shaft grooves 146 than inner splines 158, and/or a greater number of housing grooves 162 than outer splines. Similarly, the numbers of inner splines 158 may be different to the number of outer splines 160.

It will be appreciated that although the embodiment of FIGS. 3 to 8 shows the use of splines on the locking ring 156 that mate or key with corresponding grooves on the housing 162 and shaft 142, other forms of retention mechanism may be employed. For example, the retention mechanism, such as locking ring 156, may employ grooves that engage with corresponding splines on the shaft and/or housing. All, or any combination, of the shaft engagement formation(s), retention mechanism and housing engagement formation(s) (in embodiments that include housing engagement formations) may use any suitable combination of splines, grooves, fingers, keys, bolts, pins, slots, keyways, apertures, ribs, rails, holes, or any other suitable set of complementary structures that can constrain rotation of the shaft relative to the housing when the retention mechanism is in the engaged position while allowing rotation when in the disengaged position.

The skilled person will understand that the word "axially" in relation to movement of the retention mechanism and the various described formations means that there is an axial component to the movement, rather than the movement being solely axial. For example, the shaft grooves 146 and/or the housing grooves 162 may be helical rather than axial. If a hinging mechanism is used, there may be a radial and/or circumferential component to the retention mechanism's movement in addition to the axial component.

Actuators, such as the hydraulic rams 164, are optional. When provided, any suitable number of actuators may be used, depending on the configuration of the retention of mechanism and the way in which it moves axially within the housing. The actuator(s) may be of any suitable type, and may for example be hydraulic, electromagnetic, magnetic, electrical or mechanical. Although the illustrated actuators are linear, any actuator(s) used may also be partly or wholly rotational in operation. For example, an electric motor may be used in conjunction with a suitable gear or set of gears and/or a toothed rack, as will be understood by the skilled person.

Where no actuators is provided, the retention mechanism may manually moveable between the radially inward and radially outward positions, for example by a technician using his/her hands or a suitable tool. An access hole (not shown) in the housing, preferably with a cover, may be used to allow access to the retention mechanism.

The retention mechanism (such as the locking ring 156 in the presently described embodiment) may be spring-loaded into either the engaged or disengaged position. In that case, any actuator only needs to supply force in a direction to overcome the force of the spring. This reduces the need for a two-way actuator.

In the embodiments so far described, the various splines and grooves are circumferentially equally spaced. In alternative embodiments, the spacing may be unequal. Depending on the selected spacings, this may result in the shaft 142 being lockable only at one particular rotational position. It is possible for technicians to achieve this result with the embodiment of FIGS. 3 to 8 by only moving the locking ring 156 into the radially inward position when the shaft 142 is in the correct rotational position.

Alternatively, the retention mechanism, shaft engagement formations and housing engagement formations (if used) may be configured and/or arranged such that the retention mechanism can only be moved into the engaged position for a single rotational position of the shaft 142. In the context of the embodiment of FIGS. 3 to 8, a simple example of such an arrangement is where the locking ring 156 includes only a single inner spline 158, a single outer spline 160, a single housing groove 162 and a single shaft groove 146. Where a greater number of splines/grooves are desired, the relative circumferential spacing of the splines and grooves may be such that the locking ring 156 can only be moved into the engaged position for a single rotational position of the shaft. This may be achieved, for example, by arranging the splines and/or grooves such that they are rotationally asymmetrically positioned.

Figure 9A:
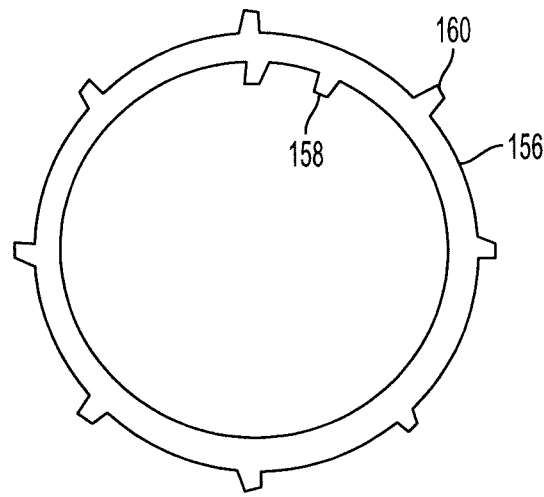
FIGS. 9A and 9B are front elevations of embodiments of locking rings, for use with an assembly according to the invention.
Figure 9B:
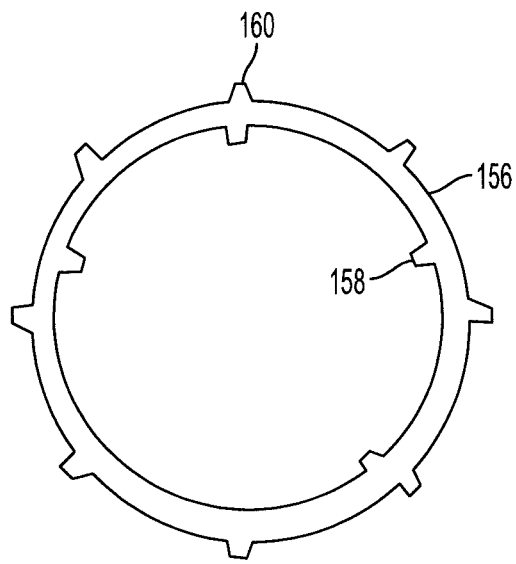

FIGS. 9A and 9B schematically show two examples of such an arrangement.

In FIG. 9A, two inner splines 158 are provided relatively close to each other. Corresponding shaft grooves are provided on the shaft 142. The housing grooves 162 and outer splines 160 may be as described above in relation to FIGS. 3 to 8, but may also be different in number and/or arrangement as compared to that embodiment.

In FIG. 9B, the inner splines 158 are also positioned in a rotationally asymmetric layout. However the inner splines 158 are more widely circumferentially distributed around the locking ring 156 as compared to the inner splines shown in FIG. 9A. This may help spread the stresses on the shaft 142, locking ring 156 and housing 126. In both the FIG. 9A and FIG. 9B examples, the locking ring 156 can only move into the engaged position when all inner splines 158 are aligned with their corresponding shaft grooves 146.

Figure 10:
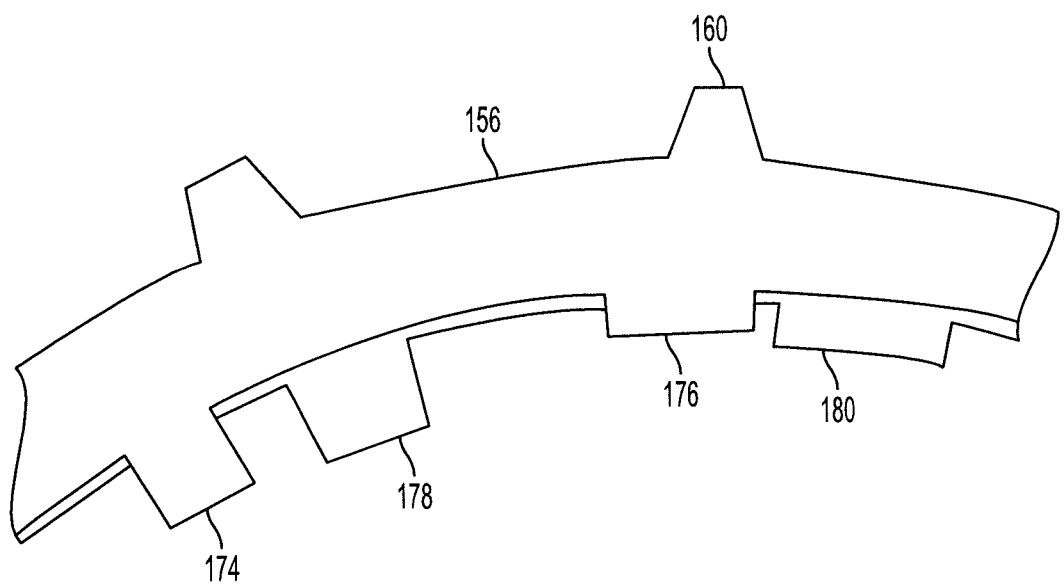
FIG. 10 is a detailed front elevation of a locking ring and shaft, for use with an assembly according to the invention.

The ability to allow the shaft 142 to be locked in only a single rotational position may also be achieved in other ways. For example, each spline may have a particular cross sectional shape or size that matches only the cross section of its corresponding groove; that is, each spline may be keyed to fit one, and only one, groove. Referring to FIG. 10, in an example with two inner splines, a first spline 174 may be approximately square in cross section while a second spline 176 may be rectangular in cross section. A first shaft groove 178 is keyed to the first spline 174, and a second shaft groove 180 is keyed to the second spline 176. The relative sizes and aspect ratios of the square and rectangular cross sections is such that the first inner spline 174 cannot move into the second shaft groove 180 and the second inner spline 176 cannot move into the first shaft groove 178. In this embodiment, it is not necessary for the splines and grooves to be positioned rotationally asymmetrically in order to ensure that the shaft 142 can be locked in only one rotational position. The skilled person will understand that different aspect ratios and shapes can be employed to provide this functionality, and that more than two different shapes, aspect ratios and/or combinations thereof may be employed to increase the number of splines and grooves that can be used with this embodiment.

The skilled person will appreciate that, with suitable adjustments, any embodiment described as allowing the shaft 142 to be locked at one rotational position may also be used in embodiments where the shaft 142 may be locked in more than one rotational position.

A lock (not shown) may be provided to maintain the retention mechanism in the engaged position or in the disengaged position, or selectively in either position.

Figure 11:
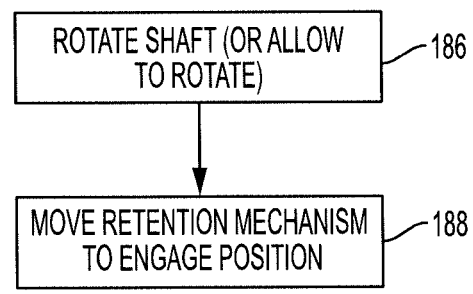
FIG. 11 is a flowchart showing a method of operating an assembly for a wind turbine, in accordance with the invention.

FIG. 11 is a flowchart showing a method of operating an assembly as defined in any of the accompanying assembly claims. While the retention mechanism is in the disengaged position, the shaft 142 is rotated 186 to a lockable position. The shaft 142 may be actively rotated (eg, with an electric motor, or manually, such as with a lever) or allowed to rotate under its own momentum. The retention mechanism is then moved 188 to the engaged position, thereby to constrain rotation of the shaft 142.

The method may be used with any of the above-described embodiments.

Although the invention has been described with reference to a number of specific embodiments, the skilled person will appreciate that the invention may be embodied in many other forms.

The invention claimed is:

1. An assembly for a wind turbine, comprising:
   a housing comprising:
      a first bearing; and
      a second bearing axially spaced apart from the first bearing;
   a shaft extending axially within the housing and being at least partly supported by the first bearing and the second bearing for rotation relative to the housing, a radially outer portion of the shaft comprising at least one shaft engagement formation positioned between the first bearing and the second bearing;
   a retention mechanism moveable axially between:
      an engaged position in which the retention mechanism engages the at least one shaft engagement formation, such that rotation of the shaft is constrained, and
      a disengaged position in which the retention mechanism does not engage the at least one shaft engagement formation, thereby allowing rotation of the shaft;
   wherein the retention mechanism comprises a locking ring, the locking ring encircling the shaft.

2. The assembly of claim 1, wherein the locking ring comprises at least one locking ring formation for engaging the at least one shaft engagement formation when the retention mechanism is in the engaged position.

3. The assembly of claim 2, wherein the at least one locking ring formation for engaging the at least one shaft engagement formation comprises an axially extending inner spline located on a radially inner portion of the locking ring.

4. The assembly of claim 1, wherein the housing comprises at least one housing engagement formation for engaging the retention mechanism.

5. The assembly of claim 4, wherein the retention mechanism engages the at least one housing engagement formation in both the engaged and disengaged positions.

6. The assembly of claim 1, wherein the locking ring comprises at least one locking ring formation for engaging at least one housing engagement formation of the housing when the retention mechanism is in the engaged position.

7. The assembly of claim 6, wherein the at least one locking ring formation for engaging the at least one housing engagement formation comprises an axially extending outer spline located on a radially outer portion of the locking ring.

8. An assembly for a wind turbine, comprising:
a housing comprising:
   a first bearing; and
   a second bearing axially spaced apart from the first bearing;
a shaft extending axially within the housing and being at least partly supported by the first bearing and the second bearing for rotation relative to the housing, a radially outer portion of the shaft comprising at least one shaft engagement formation positioned between the first bearing and the second bearing;
a retention mechanism moveable axially along a substantially linear path between:
   an engaged position in which the retention mechanism engages the at least one shaft engagement formation, such that rotation of the shaft is constrained, and
   a disengaged position in which the retention mechanism does not engage the at least one shaft engagement formation, thereby allowing rotation of the shaft,
wherein the housing comprises at least one housing engagement formation for engaging the retention mechanism,
wherein, in the disengaged position, the retention mechanism does not engage the at least one housing engagement formation, and
wherein, in the engaged position, the retention mechanism engages the at least one housing engagement formation.

9. The assembly of claim 8, wherein the at least one housing engagement formation and the at least one shaft engagement formation are configured such that the retention mechanism can simultaneously engage both the at least one housing engagement formation and the at least one shaft engagement formation when the retention mechanism is in the engaged position.

10. The assembly of claim 8, wherein the at least one housing engagement formation comprises at least one axially extending spline, groove, finger, slot, keyway, rib, or rail.

11. The assembly of claim 8, wherein the at least one shaft engagement formation comprises at least one axially extending spline, groove, finger, slot, keyway, rib, or rail.

12. The assembly of claim 8, comprising an actuator configured to selectively move the retention mechanism between the engaged and disengaged positions.

13. The assembly of claim 12, wherein the actuator is mounted to a radially inner portion of the housing.

14. The assembly of claim 12, wherein the actuator is hydraulically, electromagnetically, magnetically, or electrically powered.

15. The assembly of claim 8, comprising a viewing window for allowing visual confirmation that the retention mechanism is in the engaged position.

16. A method of operating the assembly of claim 8, comprising:
rotating, or allowing rotation of, the shaft to a lockable position while the retention mechanism is in the disengaged position;
moving the retention mechanism to the engaged position, thereby to constrain rotation of the shaft.

17. The assembly of claim 8, wherein the retention mechanism is positioned between the shaft and the housing.

18. The assembly of claim 8, wherein the retention mechanism comprises an axially extending spline, groove, finger, slot, keyway, rib, rail, locking ring, hole, or aperture.

19. An assembly for a wind turbine, comprising:
a housing comprising:
   a first bearing; and
   a second bearing axially spaced apart from the first bearing;
a shaft extending axially within the housing and being at least partly supported by the first bearing and the second bearing for rotation relative to the housing, a radially outer portion of the shaft comprising at least one shaft engagement formation positioned between the first bearing and the second bearing;
a retention mechanism moveable axially between:
   an engaged position in which the retention mechanism engages the at least one shaft engagement formation, such that rotation of the shaft is constrained, and
   a disengaged position in which the retention mechanism does not engage the at least one shaft engagement formation, thereby allowing rotation of the shaft;
wherein the housing comprises at least one housing engagement formation for engaging the retention mechanism, and
wherein the at least one housing engagement formation comprises at least one axially extending groove configured to engage the retention mechanism in at least the engaged position.

20. The assembly of claim 19, wherein the at least one axially extending groove comprises a plurality of axially extending grooves circumferentially spaced about the housing.

21. The assembly of claim 19, wherein the retention mechanism engages the at least one housing engagement formation in both the engaged and disengaged positions.

* * * * *